United States Patent [19]
McCarthy

[11] Patent Number: 5,394,748
[45] Date of Patent: Mar. 7, 1995

[54] MODULAR DATA ACQUISITION SYSTEM

[76] Inventor: Edward J. McCarthy, 14816 SE. 116th St., Renton, Wash. 98059

[21] Appl. No.: 151,961

[22] Filed: Nov. 15, 1993

[51] Int. Cl.⁶ .................. G01F 23/00; G01W 1/14
[52] U.S. Cl. .................. 73/291; 73/170.18; 73/170.21
[58] Field of Search .......... 73/291, 170.21, 170.16, 73/170.17, 170.18

[56] References Cited

U.S. PATENT DOCUMENTS

| | | | |
|---|---|---|---|
| 3,721,122 | 3/1973 | Lucas | 73/170.21 |
| 4,136,561 | 1/1979 | Mueller et al. | 73/170.18 |
| 4,153,881 | 5/1979 | Permut et al. | 73/304 R |
| 4,660,422 | 4/1987 | Eads et al. | 73/291 |
| 4,697,462 | 10/1987 | Daube, Jr. et al. | 73/170.16 |
| 4,732,037 | 3/1988 | Daube, Jr. et al. | 73/170.21 |

FOREIGN PATENT DOCUMENTS

| | | | |
|---|---|---|---|
| 358165077 | 9/1983 | Japan | 73/170.17 |
| 363029289 | 2/1988 | Japan | 73/170.21 |
| 1389453 | 4/1975 | United Kingdom | 73/170.16 |

Primary Examiner—Diego F. F. Gutierrez
Attorney, Agent, or Firm—J. Michael Neary

[57] ABSTRACT

A modular data acquisition system includes a stacked assembly of a rain gauge module mounted on a data recorder module, in turn mounted on a water level sensor module which in turn is mounted on an observation well casing. Each module has a housing that is sized and configured to engage and nest with the adjacent housing and the housings can be locked together to minimize vandalism. The rain gauge module and the water level sensor module, have sensors that are electrically connected to a data recorder in the data recorder module through connectors on the module housings that are positioned to connect and establish electrical contact when the module housings are nested together.

13 Claims, 6 Drawing Sheets

MODULAR DATA ACQUISITION SYSTEM

BACKGROUND OF THE INVENTION

1. Field of the Invention

This invention relates to simplified automated collection of environmental data, and particularly to the collection of rainfall, water flow rates in open channels and water level data in shallow groundwater, streams, open channels and wetlands by a modular data acquisition system.

2. Discussion of the Problem Solved

Environmental data is often collected to determine the functioning and characteristics of a site. Hydrologic data, including rainfall, open channel flow, groundwater levels, stream stage and wetland stage are commonly collected parameters. Increased concern with the health of the environment has prompted the collection of these data for several types of studies and disciplines.

There is a growing trend to use site specific data to evaluate the impact of various actions, such as land development or other human intervention, on the natural environment. A variety of professionals with different technical skills including biologists, ecologists, public health regulators, septic system designers, land developers, land planners, hydrologists, engineers and geologists have a need for site specific data to make better land use decisions. Typical applications in which site specific environmental data are needed include onsite septic site monitoring, wetland monitoring and stream gaging programs.

Improper siting, a common cause of septic system failure, can be avoided with more intensive collection of groundwater level and rainfall data. Successful functioning of a septic system requires vertical separation of the septic leaching zone from the water table. To ascertain whether this critical vertical separation of the septic leaching zone and water table will be maintained during wet periods of weather, it would be useful to continuously monitor rainfall and groundwater level simultaneously for extended periods to better evaluate a site's suitability for onsite sewage treatment, thereby increasing a system's probability for success.

Cumulative loss of wetlands is a problem of national concern. Whether or not a particular piece of land meets the jurisdictional definition of a wetland typically involves an evaluation of the site's soil, vegetation and hydrology. Depending upon the jurisdiction, the definition may vary. All definitions currently in use, however, evaluate the water table level during the growing season to determine if a site meets the hydrologic requirements of the wetland definition. The hydrologic characteristics of wetlands, particularly fluctuations in water level as a function of rainfall, are often used as a parameter to evaluate the hydrologic function of wetlands. Wetland monitoring programs are often designed to evaluate impacts of land development on wetland hydrology or to determine the success of a wetland mitigation. Similar data are also used in evaluating the hydrology of a site to design constructed wetlands or improve existing disturbed wetlands. Decision makers could benefit if site specific rainfall and wetland water level data were readily available. The data could be used to make more accurate wetland delineations and determinations. The data would also increase the success of constructed wetlands and wetland mitigations.

A national trend has developed in recent years in monitoring stream levels and flow rates to evaluate flooding potential, to monitor habitat quality and to provide baseline information for tracking the health of stream ecosystems. Stream gaging programs are often sponsored by public and nonprofit organizations, often employing the labor of volunteers who usually are not technically oriented.

Collection of simple environmental data can be complicated. Data collection involves several steps, including selection of monitoring equipment, assembly of instrumentation, programming, field installation, maintenance, data recording, data downloading and disassembly of field installation upon project completion. In selecting monitoring equipment, various components may not all be available from the same vendor and may not be compatible, further complicating the procurement and installation of equipment. Installing the system often requires some level of understanding of electronics and wiring of components is usually involved.

Prior art data acquisition systems are often designed to be multi-functional. Data recorders for instance, are often designed to accept a variety of different sensors. This feature of prior art systems can make them difficult to use. Many potential users are deferred by the prospect of having to climb a steep learning curve in the start-up phase of using prior art data acquisition systems.

Acquiring simple environmental data as described above with prior art systems typically requires a level of knowledge of controller programming and electronics. Many potential beneficiaries of data would be more inclined to collect data if the process were simpler than with prior art systems. The availability of simpler methods to collect data would most likely result in more data being collected to enable better decisions in assessing and protecting our nation's natural resources. A data acquisition system is needed which is a complete compatible package, quick and easy to install in the field, compact, simple to use and which has built in protection from theft and vandalism.

SUMMARY OF THE INVENTION

An object of the invention is to provide a water level and rainfall data acquisition system which is a complete compatible package and ready to use in the field. Another object of the invention is to provide a data acquisition system which is easy to assemble and disassemble by individuals without extensive training or even prior experience. A further object of the invention is to provide a data acquisition system with a nesting and quick connection assembly to allow efficient installation and disassembly in the field. A still further object of the invention is to provide a data acquisition system which requires no soldering or wiring to connect the individual components of the system. Another object of the invention is to provide a nesting assembly of components which is compact and adapted to field installation. Still another object of the invention is to provide a data acquisition system with locking components to prevent theft. Yet another object of the invention is to provide a data acquisition system which is inconspicuous in appearance to help prevent vandalism.

According to the present invention, the foregoing and other objects are attained by a data acquisition system with modular components connected to collect water level and rainfall data. The data acquisition system includes a rain gage module, a data recorder module, a water level sensor module, a connection system consisting of nesting components and watertight mated connections and software for instrument setup and data analysis. The invention provides a complete integrated system for collecting water level and rainfall data. The modular design makes the system easier to transport, install and disassemble than prior art systems, especially for those with limited electronics, computer or instrumentation experience.

This invention provides a "turn key" system for collecting water level and rainfall data. All system components are compatible and use a single data recorder for the attached instruments. The invention allows for quick installation and disassembly by providing a nesting assembly and mated electrical connection system thus eliminating the need for wiring together individual components.

The invention provides locking mechanisms to secure and immobilize the individual components of the system. The invention is designed to be compact and modular, giving it an inconspicuous appearance and making it less of a target for potential vandals on remote unprotected installations.

BRIEF DESCRIPTION OF VIEWS

DETAILED DESCRIPTION OF THE PREFERRED EMBODIMENTS

Figure 1:
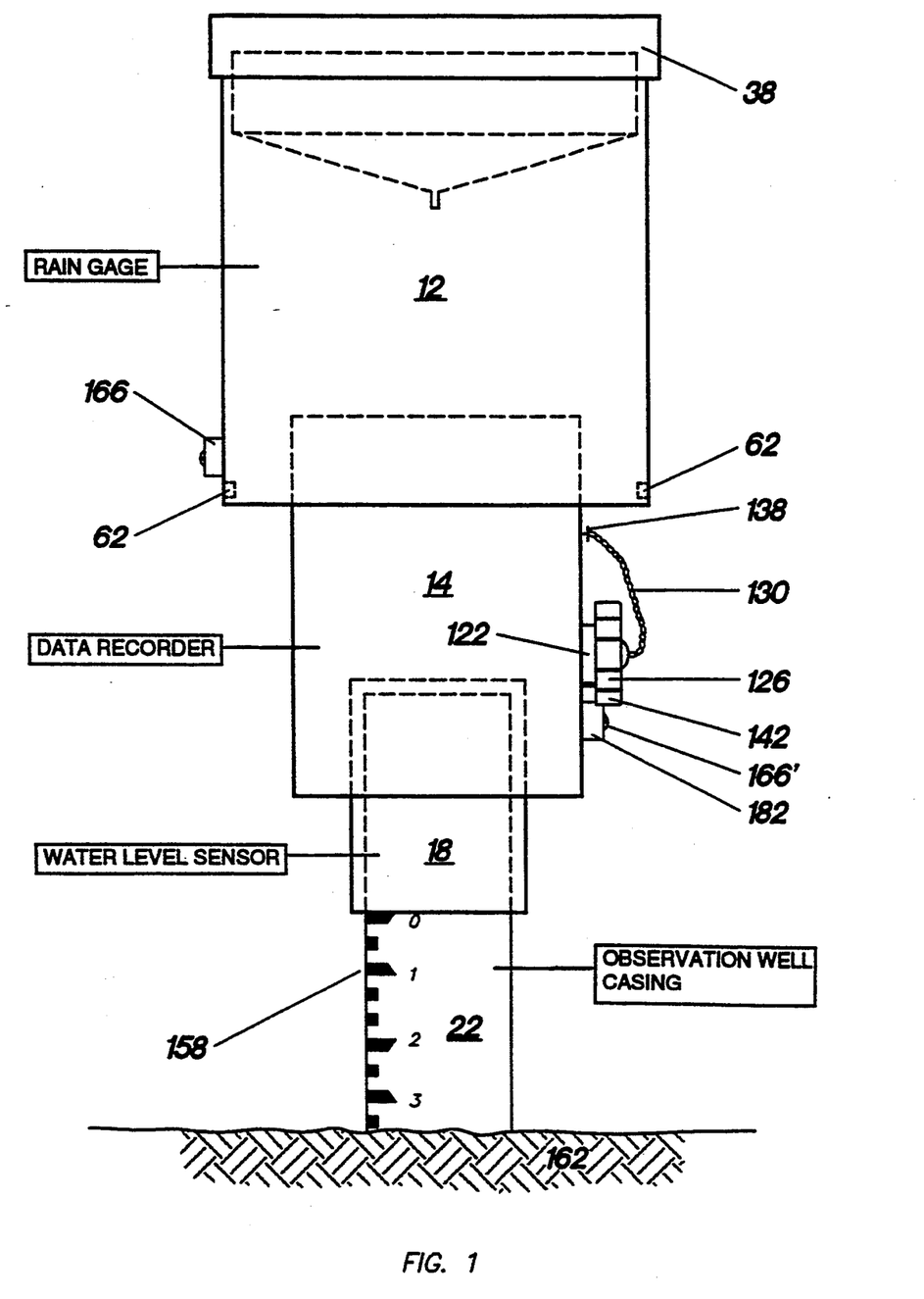
FIG. 1 is a schematic elevation of the invention assembled in the preferred configuration as in a typical field installation.

Referring now to the drawings wherein like reference numerals designate identical or corresponding parts throughout the several views, and more particularly to FIG. 1, the invention illustrated as assembled in the preferred embodiment, includes a rain gage module 12 connected to a data recorder module 14 which is in turn connected to a water level sensor module 18, such as a capacitance probe, configured to sit atop the casing 22 of an observation well. Electrical connections are provided between the rain gage module 12 and the data recorder module 14 and between the data recorder module 14 and the water level sensor module 18. These electrical connections are watertight and couple together without external wiring when the modules are connected together. The bottom portion of the rain gage module 12 is shaped to nest over and connect to the data recorder module 14. Likewise, the bottom portion of the data recorder module 14 is shaped to nest over and connect to the water level sensor module 18. The water level sensor module 18 fits onto the top of the casing 22 of the observation well which is installed to measure groundwater level or water level in an open body of water. The nesting assembly simplifies instrumentation installations, provides watertight electrical connections and provides an inconspicuous appearance for the assembled modules.

Figure 2:
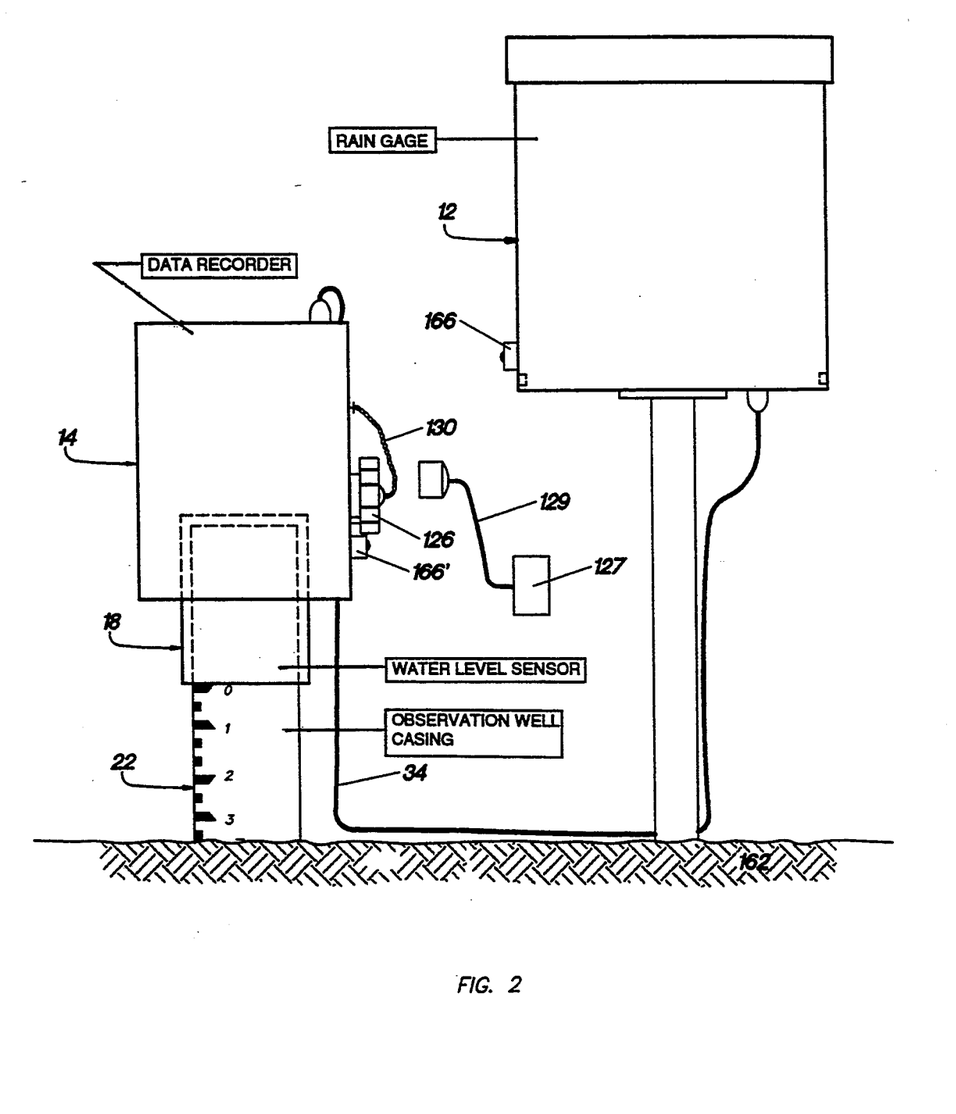
FIG. 2 is a schematic elevation of the invention assembled in an alternative configuration with the rain gage module installed in a remote location relative to the data recorder module and water level sensor module.

Referring to FIG. 2, the rain gage module 12 is shown in an alternative field configuration, located remotely from the data recorder module 14 and water level sensor module 18. An instrument cable 34 connects the rain gage module 12 to the data recorder module 14. The system can alternatively be configured to operate without the rain gage module 12, if the collection of rainfall data is not desired.

Figure 3:
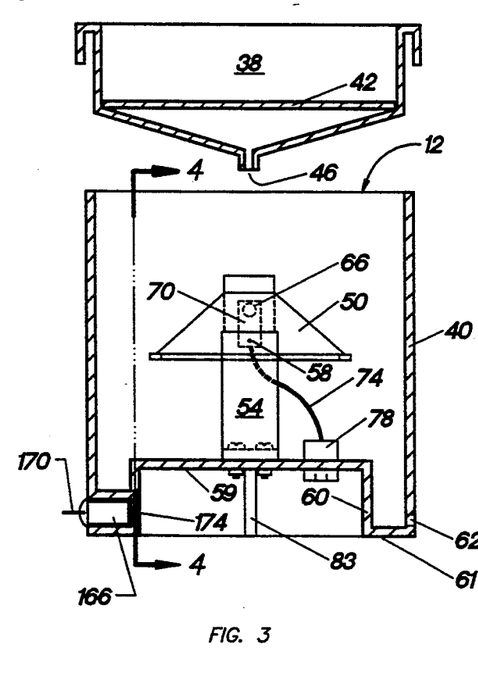
FIG. 3 is a sectional elevation of the rain gage module shown in FIG. 1, with the collection funnel exploded from the base unit, and showing the tipping bucket assembly and the connector to the data recorder module.
Figure 4:
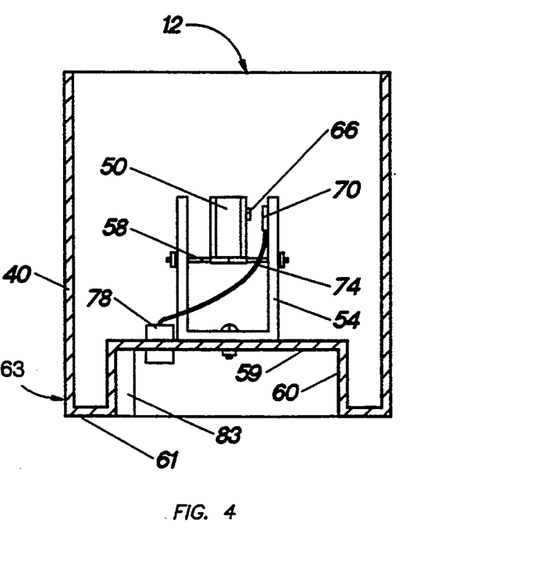
FIG. 4 is a sectional elevation of the rain gage module along lines 4—4 in FIG. 3.

Referring to FIGS. 3 and 4, rainfall enters a rain gage funnel 38 which inserts into the open top of the housing 40 of the rain gage module 12. A funnel screen 42 sits inside the rain gage funnel 38 over a funnel orifice 46 to prevent blockage of the funnel orifice 46 by foreign debris such as tree leaves and insects. The funnel orifice 46 directs collected rainfall to a tipping bucket 50 which is mounted on a bracket 54 and a pivot 58. The bracket 54 is attached to a raised section 59 in the housing 40 forming the top of a recess 60 in the bottom 61 of the housing 40. The lower end of the housing 40 surrounding the recess 60 constitutes a depending annular skirt 63 that is dimensioned to nest over the upper lip of the data recorder module 14 to prevent ingress of rain water and debris into the data recorder module 14, to provide a platform for supporting the rain gauge module 12, and to secure the rain gauge module 12 to the data recorder module 14. The tipping bucket 50 is sized to tip when a predetermined volume of rainfall has accumulated in the tipping bucket 50. Each tip of the bucket 50 represents a calibrated depth of rainfall. The accumulated rainfall empties from the tipping bucket 50 and drains from the bottom of the rain gage module 12 through port holes 62. As the tipping bucket 50 tips, a magnet 66 attached to the bucket 50 passes in front of a reed switch 70. The reed switch 70 sends a pulse to a pulse counter channel of the data recorder module 14. Commercially available tipping bucket rain gages include Texas Electronics TE-525 and Unidata Model 6506A.

The electronic pulse signal from the reed switch 70 is conducted to the data recorder module 14 by means of rain gage instrument leads 74. The rain gage instrument leads 74 connect the reed switch 70 to a male module connector 78. The male module connector 78 inserts into a female module connector 82 (shown in FIGS. 5 and 6) on the data recorder module 14 when the rain gage module 12 is nested over the top of the data recorder module 14 as shown in FIG. 1. The male module connector 78 and female module connector 82 provide an electrical connection between the rain gage module 12 and the data recorder module 14 and allow the modular components of the invention to be assembled and disassembled quickly and easily without external wiring. An alignment ridge 83 on the rain gage module 12 inserts to an alignment groove 84 on the data recorder module 14 and the modules are axially telescoped to nest the top 85 of the data recorder module 14 into the recess 60 of the rain gage module 12. The alignment ridge 83 and groove 84 insure that the male module connector 78 aligns with and properly engages inside the female module connector 82.

Figure 5:
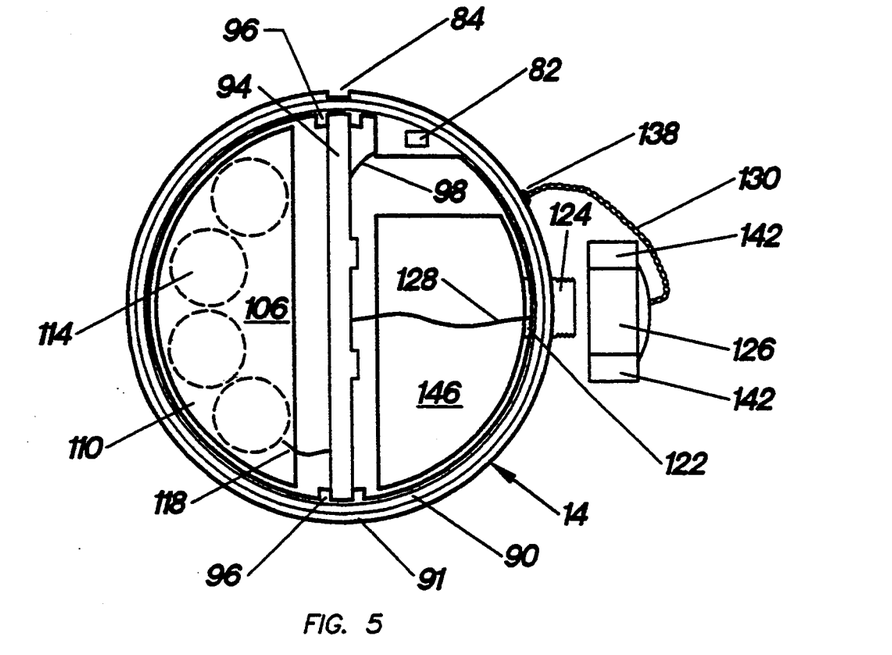
FIG. 5 is a plan view of the data recorder module shown in FIG. 1 with the access lid removed, showing the inside components of the module and the connector to the rain gage module.
Figure 6:
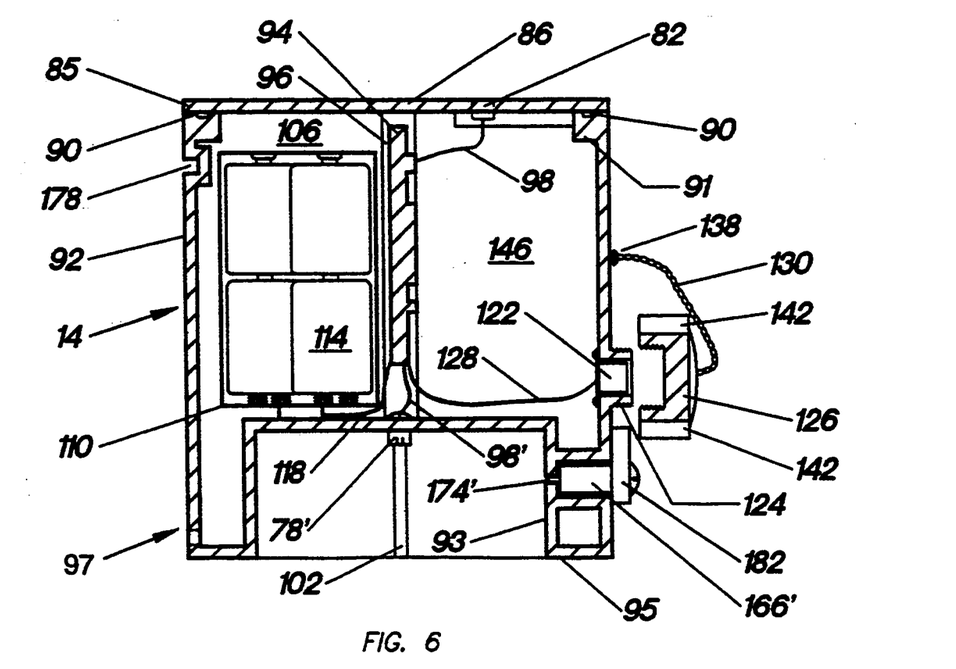
FIG. 6 is a sectional elevation of the data recorder module shown in FIG. 5.

Referring to FIGS. 5 and 6, the inside components of the data recorder module 14 are accessed by removing an access lid 86. A weather seal 90 on a flange 91 at the top of a housing 92 of the data recorder module 14 forms a weather tight seal around the perimeter of the access lid 86 to prevent leakage of water into the interior components of the data recorder module 14. The data recorder module 14 contains a microcontroller 94 which inserts into a set of controller board slots 96. The microcontroller 94 interrogates the rain gage module 12 and water level sensor module 18 at a pre-determined time interval and records measured values of rainfall and water level in the memory of the microcontroller 94. Each data point collected is recorded with the time and date to provide an historical account of the hydrologic conditions for the site monitored. Data recorders with microcontrollers commercially available to perform the described data recording task include Campbell Scientific BDR-320, Starlog Data Logger 1000 and Stevens 420 Level Logger. The microcontroller 94 contains connections to which leads 98 for conduction of signals from the instruments are attached. One set of leads 98 connects to the female module connector 82 which provides an electrical connection to the rain gage module 12. Another set of leads 987 connects to a male module connector 787 which provides an electrical connection to the water level sensor module 18. As with the attachment of the rain gage module 12 to the data recorder module 14, the data recorder module 14 has an alignment ridge 102 within the recess 93 in the bottom 95 of the housing 92 which inserts to an alignment groove 104 of the water level sensor module 18 to insure proper alignment of the male module connector 78' inside the female module connector 82'.

A battery compartment 106 in the housing 92 of the data recorder module 14 holds a power source consisting of a battery tray 110 which holds eight 1.5-volt D-cell batteries 114 for power to the microcontroller 94. A power cable 118 connects the power source to the microcontroller 94.

An RS-232 access port 122 is mounted in a threaded fitting 124 and is accessed through a threaded weather proof cap 126. The access port 122 allows connection of a PC or portable data collector 127 (illustrated schematically in FIG. 2) through a cable 129 to the microcontroller 94 for programming the microcontroller 94 and retrieving collected data. A cable 128 connects the access port 122 to the microcontroller 94. A cap chain 130 attaches the access cap 126 to data recorder module 14 to prevent loss of the cap 126. At each end of the cap chain 130 an end screw 138 fastens the chain 130. Tabs 142 are molded as part of the cap 126 for secure grip of the cap 126 when tightening or removing and also are part of the access cap 126 locking mechanism described below. A desiccant chamber 146 in the housing 92 provides a location in which a moisture absorbent material can be placed to control the humidity in the data recorder module 14 to improve longevity of the microcontroller 94. The lower end of the housing 92 surrounding the recess 93 constitutes a depending skirt 97 which is dimensioned to nest over and project below an upper lip 147 of a water level sensor module housing 148 to secure the data recorder module housing to the water level sensor module housing 148.

Figure 7:
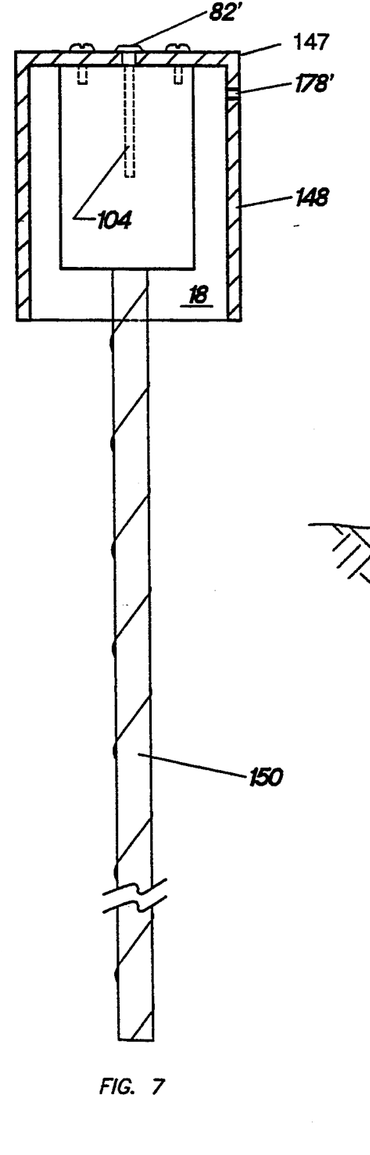
FIG. 7 is a sectional elevation of the water level sensor module shown in FIG. 1, showing the connector to the data recorder module and the water level sensor for inserting into an observation well.

Referring to FIG. 7, the water level sensor module 18 includes a housing 148 which telescopes over the well casing 22 and a water level sensor 150 which fits into the open top end of the well casing 22. The water level sensor 150 may be a submersible pressure transducer, an ultrasonic sensor or capacitive probe. Commercially available water level sensors include Unidata Capacitive Water Depth Probe Model 6521, Unidata Hydrostatic Water Depth Probe Model 7421 and Omega Series LV4000 Ultrasonic Level Transmitter. An alignment ridge 102 within the recess 93 of the housing 92 of the data recorder module 14 slides into an alignment groove 104 of the housing 148 of the water level sensor module 18. The male module connector 78' of the data recorder module 14 engages into a female module connector 82' of the water level sensor module 18. A bayonet receptacle 178' in the housing 148 receives the bayonet 174' from the module lock 166' mounted in the housing 92 of the data recorder module 14.

Figure 8:
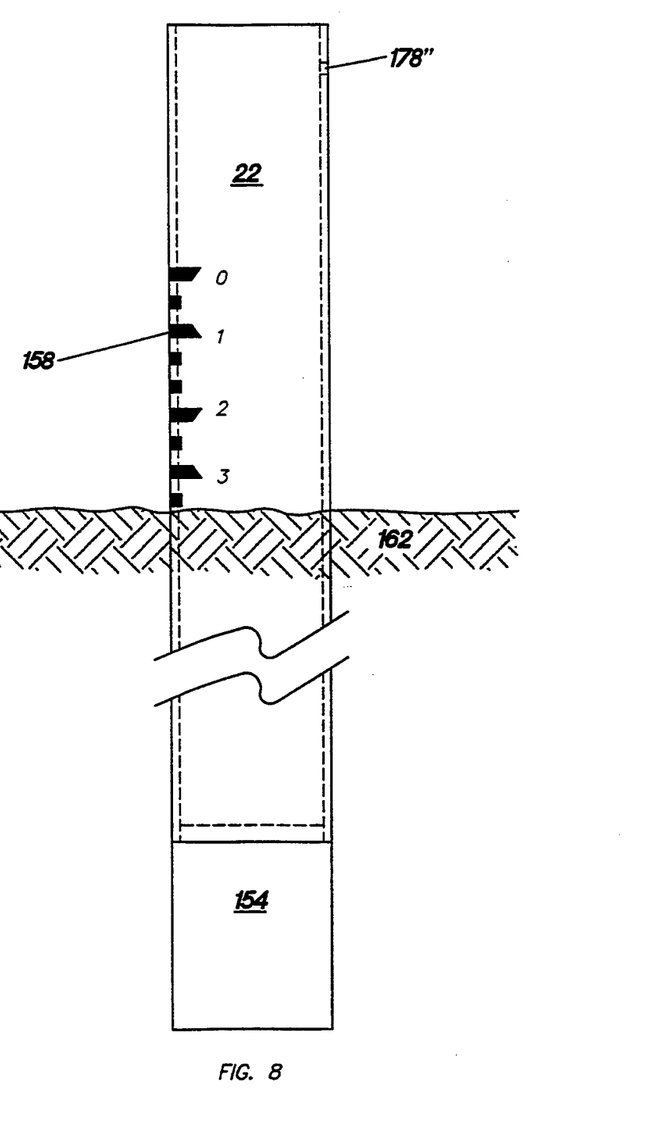
FIG. 8 is a schematic elevation of an observation well showing the offset scale and well screen.

Referring to FIG. 8, the casing 22 of the observation well serves as housing for the water level sensor module 18 and allows the water level sensor 150 to obtain an accurate water level reading. The casing 22 of the observation well has an open bottom end with an attached well screen 154 allowing water to flow in and out of the observation well 22 as the surrounding water level rises and falls.

The outside of the casing 22 of the observation well is labeled with a weather resistant offset scale 158. The offset scale 158 provides an easy means to measure the offset distance from the top of the casing 22 of the observation well to the ground surface 162. This offset distance is needed to calibrate and adjust water depth measurements and is entered as an input variable to the microcontroller 94 during setup of the system.

Figure 9A:
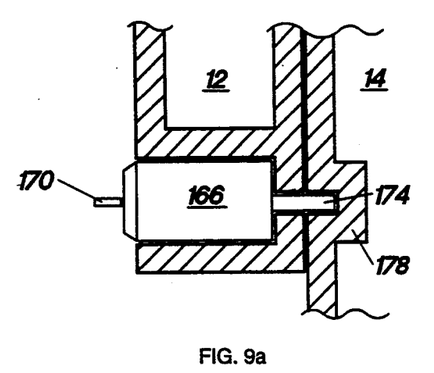
FIG. 9a is a schematic of the module lock mechanism in the locked position and FIG. 9b is the lock in the unlocked position.
Figure 9B:
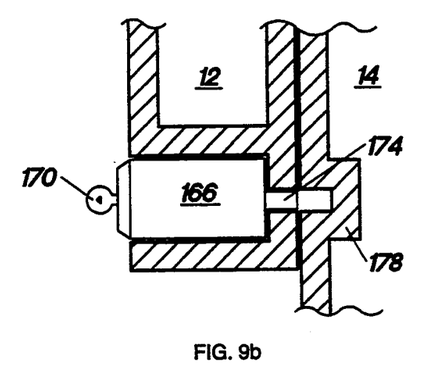

Referring to FIG. 3, a module lock 166 mounted in the housing 40 of the rain gage module 12 can be turned by a key 170 to lock the rain gage module 12 to the data recorder module 14. Referring to FIGS. 9a and 9b, the key 170 is inserted into the module lock 166 and turned clockwise to insert a lock bayonet 174 into the opposing bayonet receptacle 178. FIG. 9a shows the key 170 turned to the locked position with the lock bayonet 174 extended and engaged into the bayonet receptacle 178. FIG. 9b shows the key 170 turned to the unlocked position with the lock bayonet 174 retracted. A module lock 166' is mounted in the housing 92 of the data recorder module 14 and allows the data recorder module 14 and water level sensor module 18 to be locked to the casing 22 of the observation well by inserting the lock bayonet 174' through the bayonet receptacle 178' of the housing 148 of the water level sensor module 18 and through the bayonet receptacle 178" of the casing 22 of the observation well. Once the casing 22 of the observation well is installed and secured and the module locks 166 and 166' are in the locked position, the system modules can not be separated without unlocking the locks 166 and 166' with the key 170.

Figure 10A:
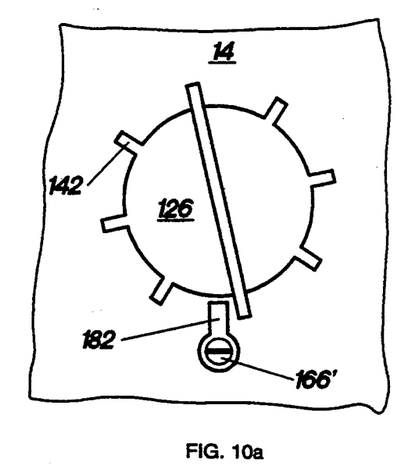
FIG. 10a is a schematic of the RS-232 port access locking mechanism on the data recorder module in the locked position and FIG. 10b is the locking mechanism in the unlocked position.
Figure 10B:
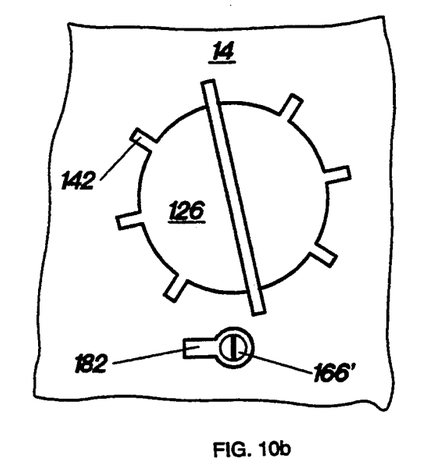

Referring to FIGS. 10a and 10b, the module lock 166' on the data recorder module 14 includes a tab 182 keyed to the lock 166' and is rotatable 90 degrees with the lock between the two positions shown in FIGS. 10a and 10b. When the lock 166' is in its locked position as shown in FIG. 10a, the tab 182 is in a position interfering with the tabs 142 on the cap 126 to prevent the cap 126 from being turned and removed. As shown in FIG. 10b, when in the unlocked position, there is adequate clearance for the tabs 142 on the access cap 126 to pass the tab 182 on the module lock 166' without contact when the access cap 126 is unscrewed.

Personal computer software which allows interface between a PC and the microcontroller 94 is commercially available. The software allows the microcontroller 94 to be programmed and collected data to be downloaded. Data analysis algorithms manage the collected data and calculate simple summary statistics and have the ability to apply hydraulic equations to convert channel water level data into flow data.

Numerous modifications and variations of the present invention are possible in light of the above. It is therefore to be understood that within the scope of the appended claims, the invention may be practiced otherwise than as specifically described herein.

I claim:

1. A modular data acquisition system, comprising:
   a rain gauge module including a rain gauge housing and a funnel for collecting rain water and conveying said rainwater to a water measuring device, said water measuring device producing a signal indicative of the amount of rain water said device measures;
   a data recorder module having a housing and a data recorder contained in said data recorder housing, said rain gauge module housing and said recorder housing being sized and configured to engage and nest together so that said rain gauge module is supported on said recorder module when said modules are coupled together;
   a water level sensor module having a housing and a water level sensing unit in said water level sensor module housing, said water level sensing unit having a sensor for sensing the level of a body of water remote from said sensing unit and producing a signal indicative of the depth of said water level below a reference position, said water level sensor module housing having a coupling structure for mounting said water level module on a well casing or support and for receiving and supporting said data recorder module;
   an electrical system for conveying electrical signals from said rain gauge module to said recorder and from said water level sensor to said recorder, said electrical system including a first pair of electrical connectors on said rain gauge module and said recorder module positioned to connect and establish electrical contact when said rain gauge module is mounted on said recorder module, and a second pair of electrical connectors on said data recorder module and said water level sensor module positioned to connect and establish electrical contact when said recorder module is mounted on said water level sensor module.

2. A modular data acquisition system as defined in claim 1, wherein:
   said first pair of electrical connectors includes a first connector fastened to an underside of said rain gage module and electrically connected to said rain water measuring device and a second connector fastened to the top side of said data recorder module, and said second pair of electrical connectors includes a third connector fastened to the top side said water level sensor module and electrically connected to said water level sensor and a fourth connector fastened to the underside of said data recorder module;
   whereby said electrical signals generated by said rain water measuring device and said water level sensor are conducted through said first and second pairs of connectors to said data recorder where they are recorded for downloading to a data collector at a later time.

3. A modular data acquisition system as defined in claim 1, wherein:
   a first set of an alignment ridge and groove is provided on said rain gauge module and said data recorder module for alignment thereof to ensure that said first pair of connectors and aligned and connected when said rain gauge module and said data recorder module are mated; and
   a second set of an alignment ridge and groove is provided on said data recorder module and said water level gauge module for alignment thereof to ensure that said second pair of connectors are aligned and connected when said said data recorder module and said water level gauge module are mated.

4. A modular data acquisition system as defined in claim 1, wherein:
   said rain gage module housing has a lower skirt that is dimensioned to nest over an upper lip of said data recorder module housing, whereby said lower skirt of said rain gage module housing surrounds said upper lip of said data recorder module housing to prevent ingress of rain water and debris into said data recorder module housing, to provide a platform for said rain gage module and to secure said rain gage module to said data recorder module;
   said data recorder module housing has a lower skirt that is dimensioned to nest over an upper lip of said water level sensor module housing, whereby said lower skirt of said data recorder module housing surrounds said upper lip of said water level sensor module housing to provide a platform for said data recorder module and to secure said data recorder module to said water level sensor module.

5. A modular data acquisition system as defined in claim 1, further comprising:
   a lock connected to one of said modules and having a tab movable when said lock is operated to engage a catch on at least one other module for locking said modules together to discourage tampering.

6. A modular data acquisition system as defined in claim 1, further comprising:
   a well casing having a top lip dimensioned to be received in and support said water level sensor module, said data recorder module and said rain gage module when attached, said well casing having a printed scale on an exterior surface extending from a top edge toward a bottom end thereof, to provide a visual indication of the distance between said top lip of said well casing to a reference position, such as the top surface of the ground in which said casing is embedded when said modular data acquisition system is erected for acquiring water level data.

7. A modular data acquisition system as defined in claim 1, further comprising:

an elongated cable for connecting said rain gage module to said data recorder module, whereby said rain gage module can be located remotely from said data recorder module and supported by a remote platform and be connected electrically by said cable to said data recorder in said data recorder module by inserting the ends of said cable into said connectors provided in the underside of said rain gage module and the top side of said data recorder module.

8. A method of remotely collecting environmental data pertaining to the water level of a body of water or groundwater over time as a function of rainfall, comprising:

embedding a well casing in the ground to a depth at least to about the mean level of the water table in the ground at that location, and leaving an open ended upper portion of said well casing protruding above the surface of the ground;

mounting a water level sensor module, having a water level sensor, on said upper portion of said well casing, with said water level sensor positioned over said open end of said well casing in position to sense the water level of said water table;

mounting a data recorder module, having a data recorder, atop said water level sensor module and establishing an electrical connection between said water level sensor and said data recorder through mating electrical connectors on said water level sensor module and said data recorder module;

mounting a rain gage module, having a rain water measuring device, atop said data recorder module and establishing an electrical connection between said rain water measuring device and said data recorder through mating electrical connectors on said rain gage module and said data recorder module.

9. A method of remotely collecting environmental data as defined in claim 8, wherein:

said step of mounting said water level sensor module atop said well casing includes nesting an upper portion of said well casing within a recess in a lower portion of said water level sensor module; and said step of mounting said data recorder module atop said water level sensor module includes nesting an upper portion of said water level sensor module within a recess in a lower portion of said data recorder module; and said step of mounting said rain gage module atop said data recorder module includes nesting an upper portion of said data recorder module within a recess in a lower portion of said rain gage module;

whereby said rain gage module is securely and stably supported on said data recorder module, and said data recorder module is securely and stably supported on said water level sensor module, which in turn is securely and stably supported on said well casing.

10. A method of remotely collecting environmental data as defined in claim 8, further comprising:
locking said modules together in adjacent pairs, and locking said water level sensor module to said well casing to discourage theft of said modules.

11. A method of remotely collecting environmental data as defined in claim 8, further comprising:
interrogating said rain water measuring device and said water level sensor periodically on a predetermined schedule as programmed into a microcontroller in said data recorder module and recording the data transmitted from said rain water measuring device and said water level sensor, along with the time and date of said recording.

12. A method of remotely collecting environmental data as defined in claim 8, further comprising:
collecting said data from said data recording module for analysis, said collecting step including attaching one end of a data cable to a communication port on said data recorder module and attaching a data collector to the other end of said cable and instructing said data recording module to transmit said data over said cable for collection by said data collector.

13. A method of remotely collecting environmental data pertaining to the water level of a body of water or groundwater over time as a function of rainfall, comprising:

collecting rain water in a rain gage module and measuring said collected rain water in a rain water measuring device;

generating a first electrical signal in said rain water measuring device that is representative of the amount of rain water collected in said rain gage module;

transmitting said first signal from said rain water measuring device through a first electrical connector on said rain gage module directly to a first mating electrical connector on a data recorder module on which said rain gage module is mounted and supported;

receiving said first signal from said first mating electrical connector and recording said first signal on a data recorder in said data recorder module;

measuring the distance between the upper surface of a body of water in a casing and a reference horizontal plane with a water level sensor in a water level sensor module mounted atop and supported by said casing;

generating a second electrical signal representative of said distance and conducting said second signal through a second electrical mating contact on said data recorder module mounted atop and supported by said water level sensor module;

conducting said second signal from said second mating electrical contact to said data recorder and recording said second signal in said data recorder.

* * * * *